United States Patent Office 2,876,061
Patented Mar. 3, 1959

2,876,061

SOLUBILIZATION OF PIGMENTS

Henry R. Mautner, Fort Lee, N. J., assignor to General Aniline & Film Corporation, New York, N. Y., a corporation of Delaware No Drawing. Application August 5, 1954
Serial No. 448,128

8 Claims. (Cl. 8—1)

This invention relates to the solubilization of pigments and more particularly to the treatment of ordinarily water-insoluble pigments to render them water soluble and useful for dyeing materials from aqueous solutions thereof.

A large proportion of the substances now available for coloring purposes are not soluble in water and must be treated in diverse manners in order to disperse them in aqueous media suitable for dyeing. A prime example of substances of this character is the class of vat dyestuffs. These dyestuffs are water-insoluble pigments which must be reduced to their leuco form by vatting with caustic and sodium hydrosulfite in order to disperse them in aqueous media. The resulting dispersions have a highly alkaline character which limits their usefulness to the dyeing of materials which can be colored in and are not detrimentally affected by such alkalinity. Further, these dispersions are unstable and settle out in some cases after about ten minutes standing, so that they cannot be stored and have to be prepared immediately prior to the intended use. There is also to be considered the added cost of the large amount of caustic and reducing agent necessary to vat the dyestuff in the dyebath. Many other water-insoluble pigments cannot be so readily dispersed in aqueous media and can, despite their other highly desirable properties, only be employed in pigment form and/or in solution in an organic solvent such as stains, paints, lacquers, varnishes, as the case may be.

It is an object of the instant invention to provide a means for rendering ordinarily water-insoluble pigments water soluble. Other objects and advantages will appear as the description proceeds.

The attainment of the above objects is made possible by the instant invention which is based upon the discovery that an ordinarily water-insoluble pigment containing a reducible and salt-forming group may be water solubilized by treatment at about 200 to 300° F. with at least an equimolecular amount of a caustic alkali and from about 5 to 100 parts by weight, per part of pigment, of a water-soluble polyhydric alcohol solvent for the pigment. The resulting polyhydric alcohol concentrate of dyestuff may be dissolved in plain cold water in any proportions to produce a stock solution or a substantially neutral aqueous dyebath solution.

As representative of the polyhydric alcohols which may be employed in the instant invention, there may be mentioned such water-soluble polyhydric alcohols as glycerol, ethylene glycol, propylene glycol, 1,4-butanediol, butanetriol, and especially diethylene glycol. These alcohols have relatively high boiling points, since the solubilizing process is carried out at temperatures below boiling and within a range of about 200 to 300° F. The alcohol is employed in an amount sufficient to provide fluidity to the composition, and is generally employed in proportions of about 5 to 100 parts by weight per part of pigment. Depending upon the solubility characteristics of the pigment in the alcohol, the lower proportions yield a fluid paste while higher proportions yield a clear solution. Proportions of about 20 to 50 parts per part of pigment are preferred.

As the caustic alkali useful in the instant invention, caustic soda and caustic potash may be employed. The amount of caustic alkali is at least molecularly equivalent to the amount of pigment employed. In view of the fact that a portion of the alkali is ordinarily taken up by the polyhydric alcohol, an amount of caustic of up to 4 molecular equivalents may be required.

As ordinarily water-insoluble pigments which may be water solubilized in accordance with the instant invention, the following may be mentioned by way of example only.

(1) Aminoanthraquinones:

Algo Pink R (C. I. 1128)

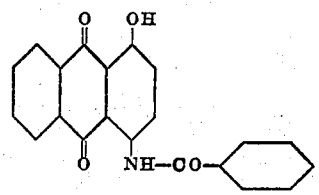

Helio Fast Yellow 6 GL (C. I. 1127)

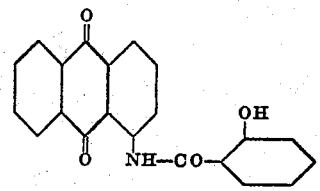

Alizarine Sky Blue B Base (unsulfonated analog of C. I. 1088)

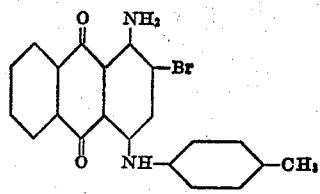

1,4-diamino-2,3-dichloroanthraquinone

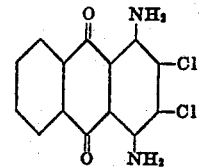

1,4-diethanolamino-5,8-dihydroxyanthraquinone

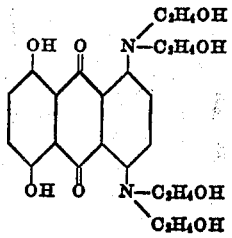

1 - amino - 4 - (p - N - methylacetylamino)phenylamino anthraquinone

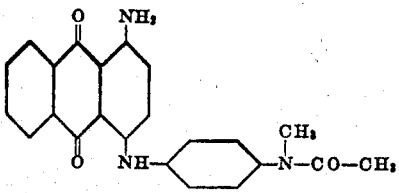

1-amino-5-benzoylaminoanthraquinone

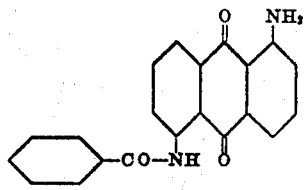

1-amino-4-benzoylaminoanthraquinone

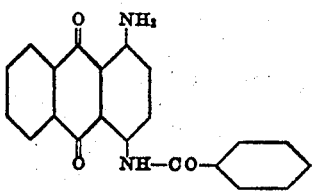

(2) Methylidyne bis pyrazolones of the formula

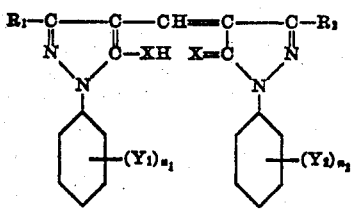

wherein $R_1$ and $R_2$ are selected from the group consisting of lower aliphatic and monocyclic aromatic radicals, X is selected from the group consisting of O and S, $Y_1$ and $Y_2$ are selected from the group consisting of hydrogen, nitro, halide, lower alkoxy, lower alkyl and sulfonamido and $n_1$ and $n_2$ are integers from 1 to 2. The methylidyne bis pyrazolones of the above formula are disclosed in the copending application of Carl M. Smith, Serial No. 448,133, filed on even date herewith. They are well known in the prior art, and may be made in a variety of manners. Compounds wherein X is oxygen may be prepared by reaction of 2 molecular equivalents of the proper 5-pyrazolone with 1 molecular equivalent of a formamide, orthoformic acid, an acyloxydialkoxyformal or chloroform and alkali. Compounds wherein X is sulfur may be prepared by reacting their oxygen analogs with phosphorus pentasulfide. It will be understood that the oxygen analogs may be prepared from the sulfur analogs by reaction with oxidizing agents under proper conditions. In the formula given above, $R_1$ and $R_2$ may represent a lower aliphatic radical such as methyl, ethyl, carbomethoxy, carboethoxy, or the like, and/or a monocyclic aromatic radical such as phenyl, chlorophenyl, ethylphenyl, methylphenyl, isopropylphenyl, methoxy phenyl, dimethoxyphenyl, ethoxyphenyl, nitrophenyl, or the like. $Y_1$ and $Y_2$ may represent in addition to the specifically named substituents, chloro, bromo, methoxy, ethoxy, methyl, ethyl, isopropyl, N-methyl- or -ethyl sulfonamide, N,N-dimethyl- or -diethyl sulfonamide or the like. Among the group of compounds encompassed by the above formula, those particularly preferred are derived from 1-phenyl-3-methyl-5-pyrazolone, 1-phenyl-3-carbomethoxy-5-pyrazolone, and 1,3-diphenyl-5-pyrazolone.

(3) Azo dyestuffs e. g. the dyestuff produced by diazotizing the compound

and coupling with 1-phenyl-5-pyrazolone-3-carboxylic acid ethyl ester.

(4) Phthalocyanines e. g. tetra (N-butylsulfonamido) copper phthalocyanine, oil soluble.

The above substances are representative of ordinarily water-insoluble pigments containing a reducible and salt-forming group which may be solubilized in accordance with this invention by treatment with caustic alkali in a water-soluble polyhydric alcohol solvent.

In preparing the concentrate of pigment, caustic alkali and polyhydric alcohol, the ingredients may be mixed in any order. The amount of pigment in the concentrate will of course depend upon the solubility of the pigment in the polyhydric alcohol, proportions of pigment to polyhydroxy alcohol, and the like, but all of the pigment should be dissolved in the polyhydric alcohol during the heating step at temperatures of about 200 to 300° F. The caustic alkali may be added prior to or during this heat treatment, such addition being usually accompanied by a change in color, generally attributed to reduction and salt formation of the dyestuff. The resulting concentrate may be used as such to prepare aqueous dyebaths, or a controlled amount of water may be added to the concentrate to produce a stock solution from which aqueous dyebaths may be prepared as desired. It should here be noted that a concentrate solution produced by heating the pigment in the polyhydric alcohol in the absence of a caustic alkali does not have the desired properties, the pigment being immediately reprecipitated upon addition of water. The addition of water to the concentrate in preparing either the stock solution or the aqueous dyebath is usually accompanied by a reversal to the original color of the pigment indicative of oxidation, whereby no special oxidation step need be applied in the subsequent preparation of dyeings.

The concentration of dyestuff in the aqueous dyebath prepared from the concentrate will of course depend upon the material being dyed, material:liquor ratio, the shade desired, the duration of dyeing, and the like. Depending upon the shade desired, the aqueous dyebath may contain from about .05 to 10% of dyestuff by weight of the material being dyed, the material:liquor ratio usually falling within the range of about 1:20 to 1:50. The dyebath may also contain assistants and/or carriers for facilitating dyeing of particular materials. Thus, for dyeing acetate film and fibers, the dyebath solution may comprise ethyl alcohol and water in proportions of up to about 80% by weight of the ethyl alcohol. Similarly, for dyeing Dacron and the like, small amounts of carriers may be added such as benzoic acid, ortho- and para-phenylphenol, m-cresol, phenylmethyl carbinol and the like. In contrast to the usual vat dispersions produced with large amounts of caustic alkali and sodium hydrosulfite and having a pH of 9 to 11 or more, the aqueous dyebaths produced in accordance with this invention are substantially neutral with a pH of no more than about 8 and may even be acidified to a pH of about 5 without precipitation of the pigment.

The material which may be dyed in the resulting aqueous dyebath may be in any desired form such as films, fibrous material, and the like. In addition to wool, silk and the like, outstanding results have been obtained in dyeing synthetic polymeric thermoplastic material in film or fibrous form. Such material may have a basis of polyacrylonitrile, polyvinyl chloride, polyvinyl acetate, polyvinylidene chloride, polyethylene, polyethylene terephthalate, nylon, cellulose acetate, and mixtures and copolymers thereof. As representative of readily available synthetic fibrous material which may be dyed with the aqueous dyebaths of this invention, there may be mentioned Dacron (polyethylene terephthalate), Dynel and Vinyon N (acrylonitrile-vinyl chloride copolymer), Acrilan (at least 75% polyacrylonitrile), saran (polyvinylidene chloride) nylon, acetate rayon, and the like. The fibrous material may be in any of the usual forms, as for example in the form of staple fiber or continuous filaments in bulk form or in the form of tow, rope, yarns, slubbings, warps, fabrics, felts and the like, and treated as a wound package, running lengths, fibrous stock, bulk, etc.

The following examples, in which parts are by weight unless otherwise indicated, are illustrative of the instant invention and are not to be regarded as limitative.

Example 1

One gram of Algol Pink R and 20 cc. of diethylene glycol were pasted and heated to 220 to 250° F. To the red colored solution there was added 0.25 gram of dry caustic potash and heating continued with concurrent mixing. The color changed from red to a bluish-violet. The volume was then made up to 1 liter by addition of cold water, resulting in a clear reddish colored stock solution.

One percent dyeings were prepared by mixing 100 cc. portions of the stock solution with 100 cc. of tap water and treating 10 gram samples of Dacron, Saran, wool and silk in the resulting dyebaths (1:20 fiber-liquor ratio). The materials were dyed in an even pink shade having very good fastness properties.

Example 2

1.0 gram of tetra (N-butylsulfonamido) copper phthalocyanine was pasted up in 0.3 g. caustic soda and 20 cc. diethylene glycol, and heated to 220–250° F. The resulting solution was diluted with water to 1 liter serving as a stock solution from which varying amounts, depending on the depth of shade required, were taken to make aqueous dyebaths by further dilution with water. Employing these dyebaths, the following materials were dyed a bright turquoise blue: Dacron, acetate, nylon, wool and silk, the latter exceptionally bright.

The original concentrated dye solution in diethylene glycol remained stable and useful for long periods of time. For special application this original dye solution was diluted with various amounts of ethyl alcohol and water and padded onto acetate fabric and film yielding a bright and level coloration without further treatment except drying.

Example 3

1.0 g. of 1,4-diamino-2,3-dichloroanthraquinone was solubilized by the procedure described in Example 2. Aqueous dyebaths prepared from this solution dyed acetate, nylon, Dacron, Acrilan, saran, wool and silk a reddish-violet. Good dyeings on acetate by merely padding and drying were obtained as in Example 2.

Example 4

1.0 g. of 1-amino-5-benzoylamino-anthraquinone was solubilized by the procedure described in Example 2. Bright orange dyeings were obtained on the same materials.

Example 5

10 g. of Alizarine Sky Blue B Base was solubilized by the procedure described in Example 2. Excellent blue dyeings were obtained on acetate, Dacron, nylon and wool.

Example 6

1.0 g. of methylidyne bis (1-phenyl-3-methyl-5-pyrazolone) was solubilized by the procedure described in Example 2. Excellent yellow to orange dyeings were obtained in Dacron, acetate, nylon, wool and saran. Good dyeings on acetate by merely padding and drying were obtained as in Example 1.

Example 7

1.0 g. 1,4-diethanolamino-5,8-dihydroxyanthraquinone was pasted up with 15.0 cc. diethylene glycol and 0.30 g. KOH dry and heated to 300–320° F. until complete solution was obtained.

The resulting liquor was diluted after cooling with 120 cc. of water and padded onto cellulose acetate sharkskin fabric. A good padding was obtained which required only 15 minutes at 160° F. for full development on the jig.

Compared to conventional jig dyeing with above color in dispersion, a better color yield and superior penetration of the fabric was obtained.

An aqueous dyebath made by diluting 1 cc. of the original glycol solution with water to 200 cc. was very stable, and good acetate dyeings were obtained.

Example 8

The procedure of Example 7 was repeated using a dyestuff mixture containing about 40 percent by weight of the dyestuff of Example 7 and about 60 percent of 1-amino-4-(p-N-methylacetylamino) phenylaminoanthraquinone. Similarly excellent results were obtained.

This invention has been described with respect to several preferred embodiments, and various modifications and variations thereof will become obvious to the person skilled in the art. It is to be understood that such modifications and variations are to be included within the spirit and purview of this application and the scope of the appended claims.

I claim:

1. A process for water-solubilizing an ordinarily water-insoluble aminoanthraquinone pigment containing no more than one monocyclic aryl substituent comprising treating said pigment at about 200–300° F. under substantially anhydrous conditions and in the absence of hydrosulfite reducing agent with a treating medium consisting essentially of at least an equimolecular amount of a caustic alkali and about 5 to 100 parts by weight per part of pigment of a water-soluble solvent selected from the group consisting of polyhydroxy alkanes and polyhydroxy alkane ethers containing no more than 4 carbon atoms.

2. A process as defined in claim 1 wherein said solvent is diethylene glycol.

3. A process as defined in claim 1 wherein said solvent is 1,4-butanediol.

4. A process for producing an aqueous solution of an ordinarily water-insoluble aminoanthraquinone pigment containing no more than one monocyclic aryl substituent comprising treating said pigment at about 200–300° F. under substantially anhydrous conditions and in the absence of hydrosulfite reducing agent with a treating medium consisting essentially of at least an equimolecular amount of a caustic alkali and about 5 to 100 parts by weight per part of pigment of a water-soluble solvent selected from the group consisting of polyhydroxy alkanes and polyhydroxy alkane ethers containing no more than 4 carbon atoms, and then dissolving the resulting composition in water.

5. A process as defined in claim 4 wherein said solvent is diethylene glycol.

6. A process as defined in claim 4 wherein said solvent is 1,4-butanediol.

7. A process as defined in claim 1 wherein said pigment corresponds to the formula

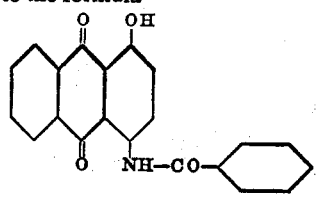

8. A process as defined in claim 1 wherein said pigment corresponds to the formula
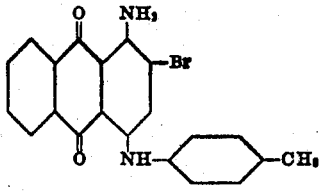
References Cited in the file of this patent
UNITED STATES PATENTS
| | | |
|---|---|---|
| 1,771,763 | Bauder | July 29, 1930 |
| 2,047,650 | Sala | July 14, 1936 |
| 2,069,210 | Bishop | Feb. 2, 1937 |
| 2,095,077 | Payne | Oct. 5, 1937 |
| 2,201,010 | Papini | May 14, 1940 |
| 2,254,372 | Kvalnes | Sept. 2, 1941 |
| 2,361,301 | Libby | Oct. 24, 1944 |
| 2,402,961 | Hill | July 2, 1946 |
| 2,485,168 | Rintelman | Oct. 18, 1949 |
| 2,493,724 | Mayhew | Jan. 3, 1950 |
| 2,683,643 | Baumann | July 13, 1954 |